US009688343B2

(12) United States Patent
Takanashi et al.

(10) Patent No.: US 9,688,343 B2
(45) Date of Patent: Jun. 27, 2017

(54) TUBULAR HANDLEBAR WITH INTEGRATED SPEAKERS

(71) Applicant: SONY CORPORATION, Tokyo (JP)

(72) Inventors: Shin Takanashi, Tokyo (JP); Yuji Matsumoto, Tokyo (JP); Shimpei Hirano, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 0 days.

(21) Appl. No.: 14/835,119

(22) Filed: Aug. 25, 2015

(65) Prior Publication Data

US 2016/0059920 A1 Mar. 3, 2016

Related U.S. Application Data

(60) Provisional application No. 62/043,709, filed on Aug. 29, 2014.

(51) Int. Cl.
  *B62K 21/12* (2006.01)
  *B62K 19/40* (2006.01)
  *B62J 99/00* (2009.01)

(52) U.S. Cl.
  CPC .............. *B62K 21/12* (2013.01); *B62K 19/40* (2013.01); *B62J 2099/0033* (2013.01)

(58) Field of Classification Search
  CPC .............. B62K 21/12; B62J 2300/0006; B62J 2099/0006; Y10T 74/20822
  See application file for complete search history.

(56) References Cited

U.S. PATENT DOCUMENTS

| 4,856,364 A * | 8/1989 | Dixon | ....................... B62J 99/00 280/288.4 |
| 2010/0103261 A1* | 4/2010 | Felt | .......................... B62J 99/00 348/148 |

FOREIGN PATENT DOCUMENTS

| JP | 2004-359034 A | 12/2004 | |
| WO | WO 9732450 A1 * | 9/1997 | ............... H04R 5/02 |

* cited by examiner

*Primary Examiner* — Thomas Diaz
(74) *Attorney, Agent, or Firm* — Oblon, McClelland, Maier & Neustadt, L.L.P.

(57) ABSTRACT

A tubular handlebar includes an internal peripheral surface and a stem head with a mounting system for a mobile device. The tubular handlebar includes a open end, a closed end, at least one speaker unit embedded into at least one through hole of the internal peripheral surface, and a bass reflex system to enhance the acoustic characteristics of the sound generated by the at least one speaker unit. The tubular handlebar has a sound box affixed to the internal peripheral surface of the tubular handlebar and housing a rear part of the at least one speaker unit. The bass reflex system includes a bass reflex duct connecting the sound box with the first end. The mounting system further includes a first connector to electrically connect the mobile device to a second connector. The second connector can be detached or reattached to the at least one speaker unit.

20 Claims, 9 Drawing Sheets

TUBULAR HANDLEBAR WITH INTEGRATED SPEAKERS

CROSS-REFERENCE TO RELATED APPLICATIONS

This application is based upon and claims the benefit of priority from U.S. Provisional Application Ser. No. 62/043,709, filed Aug. 29, 2014, the entire contents of which are incorporated herein by reference.

BACKGROUND

Field of the Disclosure

The present application generally relates to handlebars for bicycles with sound systems. More precisely, the present application relates to handlebars with integrated sound systems providing improved acoustic characteristics.

Description of the Related Art

Recently, both the use of bicycles and mobile devices, e.g. smart phone, tablet or music players, has become extremely popular, notably in sporting activities. Consequently, riding a bicycle while enjoying the functionalities offered by a mobile device and notably sound outputs, e.g. music, vocal instructions for global positioning systems, is needed. Furthermore, sound outputs with loud and good acoustic characteristics are particularly desired by riders.

To obtain loud and good acoustic characteristics, riders have to attach to their bicycle sound apparatuses similar to "boom boxes" or "portable stereo systems" with protruding speakers. Though such apparatuses may have achieved success in providing sound output with high volume and good quality, they have numerous shortcomings.

Notably, such apparatuses may be voluminous, bulky, heavy, wobbly, and create protrusions on the bicycle on which they are mounted. More precisely, these apparatuses may affect the weight repartition on the bicycle generating balance issues for the rider. They may also affect the aerodynamic characteristics of the bicycle and generate obstacles for the movements of the rider. Such apparatuses are usually insecurely affixed to the bicycle and easily wobble or vibrate. Finally, all of these problems may endanger the riders using such apparatuses.

Thus, an apparatus for bicycle providing sound output solving the aforementioned problems is desired.

SUMMARY

Accordingly, the object of the present invention is to provide a handlebar for bicycle which overcomes the above-mentioned limitations of conventional sound apparatus for bicycles.

The handlebar for bicycle of the present invention eliminates the problems of voluminous, bulky, heavy, wobbly, and create protrusions voluminosity, bulkiness, wobbliness and weight repartition by using the tubular structure providing by the handlebar. The tubular structure enables to integrate a sound system with enhanced acoustic characteristics without generating any sort of protrusion on the handlebar. More precisely, the tubular structure houses speaker units as well as elements to enhance acoustic such as a sound box or a bass reflex system. In addition, the proposed handlebar may be affixed to a stem head having the ability to incorporate a mobile device that can be connected to the sound system of the handlebar via detachable connectors.

DETAILED DESCRIPTION OF THE EMBODIMENT

Figure 1:
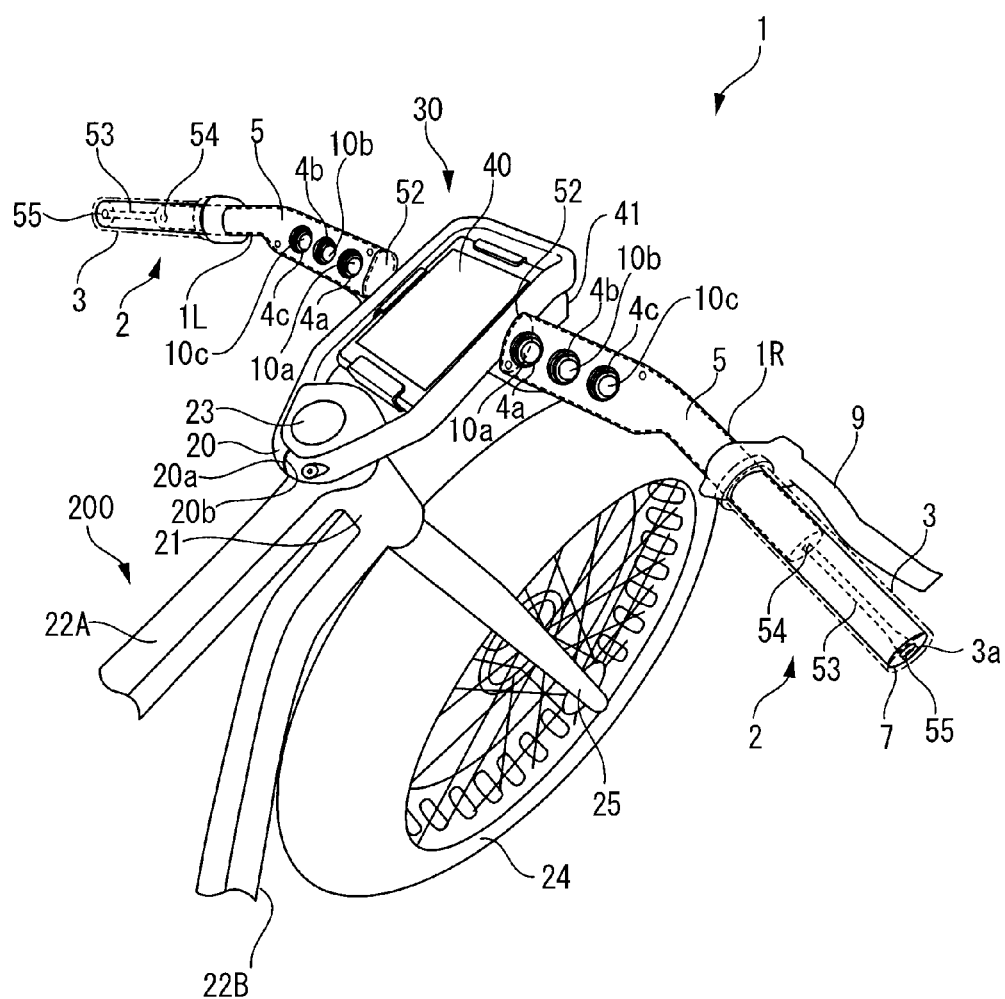
FIG. 1 is a perspective view of a bicycle with a tubular handlebar including a mobile device, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a perspective view of a bicycle 200 with a tubular handlebar 1 including a mobile device 40, according to certain aspects of the disclosure.

Figure 2:
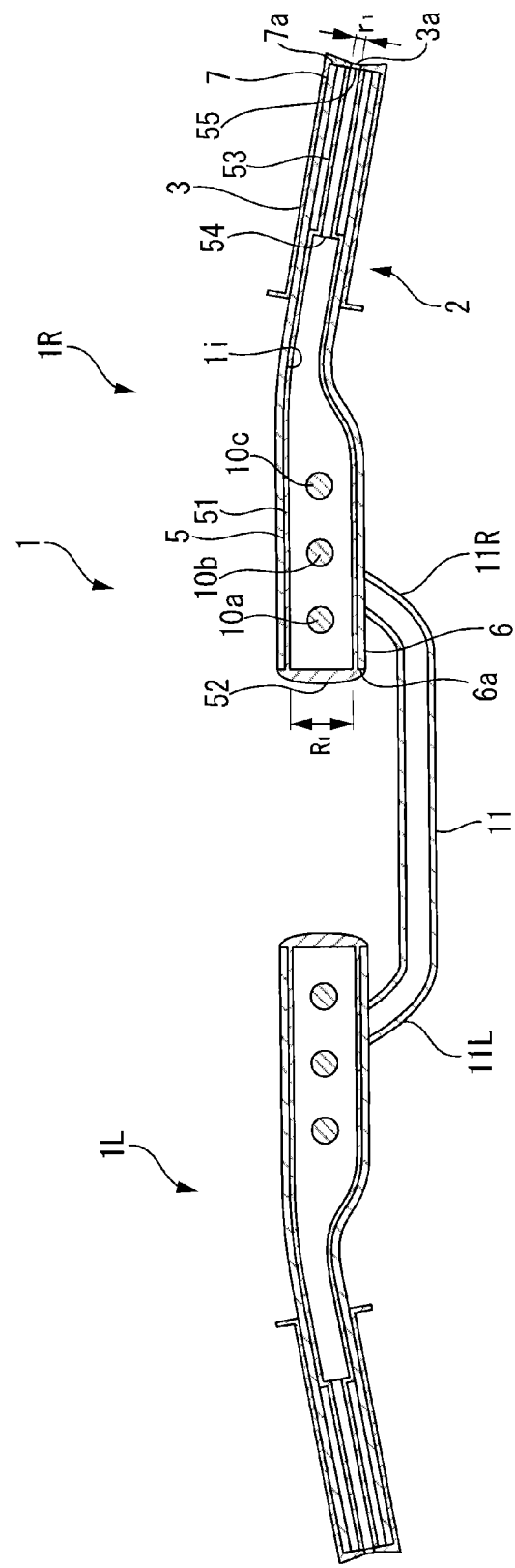
FIG. 2 is a sectional view through a horizontal plane of the tubular handlebar showing a left side tubular handlebar component and a right side tubular handlebar component, according to certain aspects of the disclosure.

The tubular handlebar 1 includes a left side tubular handlebar component 1L, a right side tubular handlebar component 1R, and a connection member 11, shown in FIG. 2, connecting the left side tubular handlebar component 1L and the right side tubular handlebar component 1R.

Both the right side tubular handlebar component 1R and the left side tubular handlebar component 1L have a grip area 2 providing an area that can be grasped by a user. The grip area 2 includes a brake lever 9 and a grip 3 recovering an external peripheral surface of the right side tubular handlebar component 1R and the left side tubular handlebar component 1L.

A stem head 20 is affixed to the connection member 11 and holds the mobile device 40. In addition, the stem head 20 is clamped around an stem rod 23 directly connected to a front fork 25 mounted on a front wheel 24.

A first top tube 22A and a second top tube 22B located below the first top tube 22A are connected to a head tube 21 housing the stem rod 23. The stem rod 23 swivels inside the head tube 21 to transmit the motion of the tubular handlebar 1 to the front wheel 24.

In addition, the stem head 20 has a split with a first edge 20a and a second edge 20b that can be pushed against each other or pulled away from each other through a horizontal threaded hole 28 and a fastening device, e.g. a bolt. Through this split, the stem head 20 can be clamped around different head shapes that the stem rod 23 may have, e.g. spherical, oval or hexagonal.

FIG. 2 is a sectional view through a horizontal plane of the tubular handlebar 1 showing the left side tubular handlebar component 1L and the right side tubular handlebar component 1R, according to certain aspects of the disclosure.

The left side tubular handlebar component 1L, the right side tubular handlebar component 1R, and the connection member 11 are hollow tubes made from rigid materials such as metallic alloys. Cross-sections of the left side tubular handlebar component 1L, the right side tubular handlebar component 1R, and the connection member 11 are not restricted to be circular.

The connection member 11 is formed by a straight middle section between a curved left end 11L affixed to the left side tubular handlebar component 1L and a curved right end 11R affixed to the right side tubular handlebar component 1R. The curved left end 11L is affixed onto a lower part of the external peripheral surface of the left side tubular handlebar component 1L. Similarly, the curved right end 11R is affixed onto a lower part of the external peripheral surface of the right side tubular handlebar component 1R.

The fixation of the connection member 11 to the left side tubular handlebar component 1L and the right side tubular handlebar component 1R may be performed via irreversible fastening means (e.g. welding, riveting, or gluing), reversible fastening means (e.g. press fitting, screwing or bolting), or any other means of fixation know by a person having ordinary skill in the art.

Since the left side tubular handlebar component 1L and the right side tubular handlebar component 1R are symmetrical about a plane holding the stem rod 23, herein the following descriptions will focus on the right side tubular handlebar component 1R, unless stated otherwise.

The right side tubular handlebar component 1R is characterized by an inner edge part 6 with an inner opening part 6a facing the left side tubular handlebar component 1L and an outer edge part 7 with an outer opening part 7a recovered by the grip 3. The inner opening part 6a is completely occluded by a cover part 52 while the outer opening part 7a is partially opened through a hole 3a in the grip 3. The inner opening part 6a is characterized by an internal diameter R1 while the hole 3a is characterized by internal diameter r1, the internal diameter R1 being bigger than the internal diameter r1.

Near the inner edge part 6, three speaker units 10a-c are embedded into three through holes 4a-c, drilled through the left side tubular handlebar component 1L, respectively. In this embodiment three speaker units are represented, but in another embodiment, the total number of speaker units may be less or more than three depending whether or not the sound volume generated by the all the speakers is sufficiently audible for the user of the bicycle 200.

A portion of the inside of the left side tubular handlebar component 1L forms for the speaker units 10a-c a sound box 5 with an enclosure 51. On one end, the enclosure 51 is closed by the cover part 52 while on another end the enclosure is opened to the external environment through a bass reflex system.

In one embodiment, the bass reflex system is implemented by a bass reflex duct 53 protruding from the enclosure 51 to the hole 3a, as illustrated in FIG. 2. The connection between the enclosure 51 and the bass reflex duct 53 is done through a duct inlet port 54 while the connection between the hole 3a and the bass reflex duct 53 is done through a duct exit 55. The duct exit 55 has an opening area that is equal or lower than an opening area of the hole 3a.

The sound box 5 is made from composite, raw or polymeric materials as Acrylonitrile-Butadiene-Styrene (ABS) resins.

The sound box 5 has an external peripheral surface in immediate contact with an internal peripheral surface 1i of the right side tubular handlebar component 1R. Such immediate contact prevents the sound generated from the top part of the speaker units 10a-c from contacting the out of phase sound generated by the rear part of the speaker units 10a-c and cancelling each other. Consequently, the acoustic characteristics of the sound generated by the speaker units 10a-c are improved.

The acoustic characteristics of the sound box 5 can be modified by adjusting the volume of the enclosure 51 as well as the volume of the bass reflect duct 53. For example, the volume of the enclosure 51 may be increased or decreased by increasing or decreasing the extension of the enclosure 51 along the right side tubular handlebar component 1R or the internal diameter R1 of the inner opening part 6a. Similarly, the volume of the bass reflect duct 53 can be increased or decreased by adjusting the extension or the internal diameter r1 of the bass reflect duct 53.

Having the sound box 5 inside the available space provided by the tubular handlebar 1 prevents the bicycle 200 from having protrusions. Although the volume of the sound box 5 as well as the size and number of speaker units 10a-c are limited due to size and shape restrictions of the tubular handlebar 1, improved acoustic characteristics are achieved via the bass reflex duct 53. The sound generated from the rear part of the speaker units 10a-c enters into the bass reflex duct 53 through the duct inlet port 54 and is released from the bass reflex duct 53 to the external environment through the duct exit 55. In such a way, the reproduction of the lowest frequencies generated from the rear part of the speaker units 10a-c is enhanced.

Figure 3:
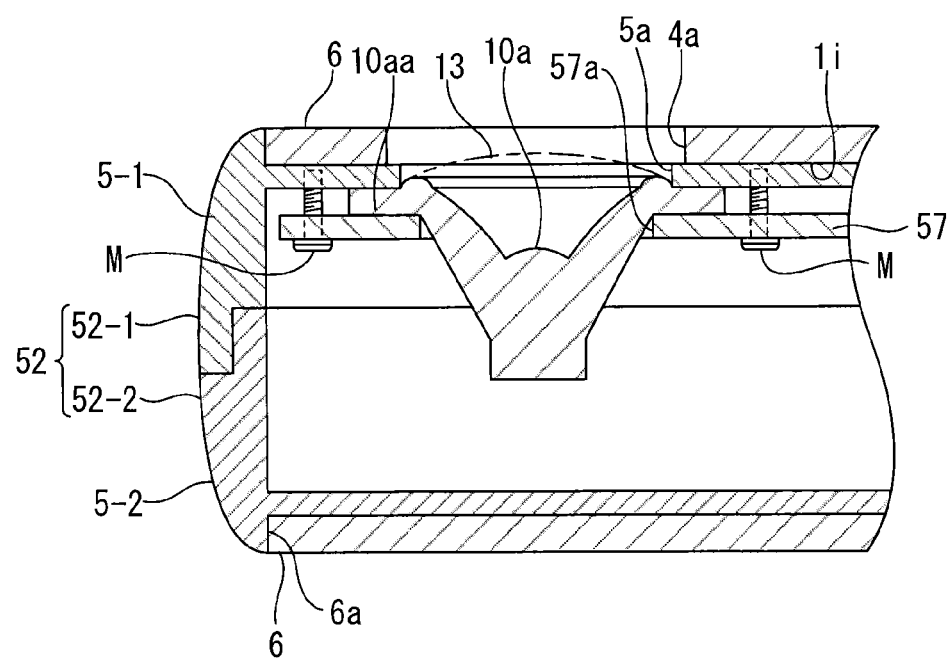
FIG. 3 is a sectional view through a vertical plane of the right side tubular handlebar component focusing on a speaker unit, according to certain aspects of the disclosure.

FIG. 3 is a sectional view through a vertical plane of the right side tubular handlebar component 1R focusing on the speaker unit 10a, according to certain aspects of the disclosure.

The speaker unit 10a is clamped onto the internal peripheral surface of the sound box 5 by a rigid sheet 57. The rigid sheet 57 may be made of any kind of rigid materials such as metallic or polymeric alloys.

The speaker unit 10a is partially inserted inside a hole 57a of the rigid sheet 57 by having a front lip 10aa that rests on a edge of the hole 57a. The front lip 10aa is clamped between the edge of the hole 57a and the edge of an opening 5a in the internal peripheral surface of the sound box 5.

The opening 5a faces the through hole 4a of the internal peripheral surface of the right side tubular handlebar component 1R. In addition, the opening 5a may have a diameter smaller or equal to a diameter of the through hole 4a.

The front lip 10aa is maintained clamped through the action of a plurality of bolts M that goes through the rigid sheet 57 and threads inside the sound box 5. The plurality of bolts M has a predetermined length such that the plurality of bolts M does not go completely through the sound box 5 and contact the internal peripheral surface of the right side tubular handlebar component 1R.

The three speaker units 10a-c may be all clamped together onto the internal peripheral surface of the sound box 5 by one singular metal sheet, such as the rigid sheet 57, or be clamped separately onto the internal peripheral surface of the sound box 5 by several singular metal sheets, each similar to the rigid sheet 57. Furthermore, the plurality of bolts M may be replaced by any kind of fastening devices, such as screws, rivets, clips, adhesives or any fastening device known by a person having ordinary skill in the art.

The top part of the speaker units 10a-c may be protected by a protective cover 13 such as a mesh.

The sound box 5 is composed by a first member 5-1 and a second member 5-2 jointed together by a plurality of fastening devices, e.g. screws, rivets, clips, adhesives or any fastening device known by a person having ordinary skill in the art. The first member 5-1 supports the speaker units 10a-c while the second member 5-2 does not. Similarly, the cover part 52 is composed by a first cover part 52-1 and a second cover part 52-2 jointed together via a half lap splice joint.

In addition, the sound box 5 is affixed and maintained in place by a plurality of external fastening devices in order to have the speaker units 10a-c facing the through-holes 4a-c. The plurality of external fastening devices may be any kind of fastening devices or means, such as screws, rivets, or clips, gluing, double sided adhesive or any technic known by a person having ordinary skill in the art.

Figure 4:
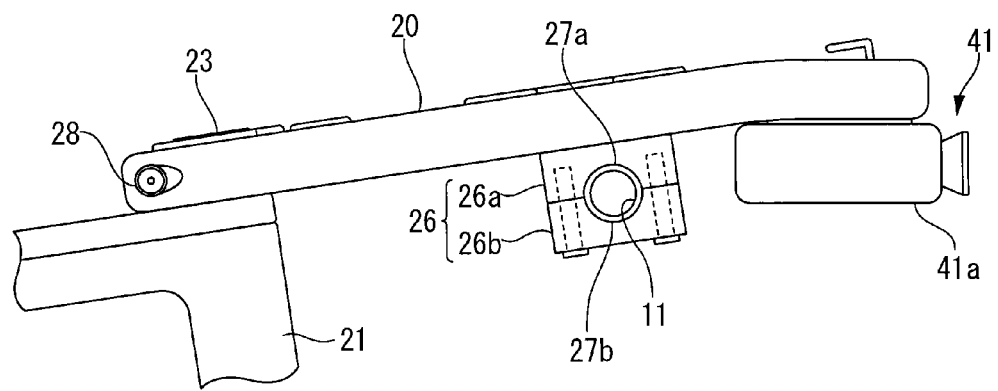
FIG. 4 is a side view of a stem head of the bicycle without the tubular handlebar, according to certain aspects of the disclosure.

FIG. 4 is a side view of the stem head 20 mounted onto the head tube 21 of the bicycle 200 without the tubular handlebar 1, according to certain aspects of the disclosure.

The stem head 20 includes a tubular handlebar clamp 26 to clamp the connecting member 11. The tubular handlebar clamp 26 has an upper side member 26a affixed below the stem head 20 and a lower side member 26b that can be attached and detached from the upper side member 26a through a pair of fastening devices such as bolts. The upper side member 26a and the lower side member 26b have an upper groove 27a and a lower groove 27b, respectively. The connection member 11 is clamped between the upper groove 27a and the lower groove 27b by fastening the lower side member 26b onto the upper side member 26a.

A front camera case 41a housing a front camera 41 is attached bellow and at the front of the stem head 20 with the camera 41 facing the road ahead of the bicycle 200. In addition, a rear camera 42, similar to the front camera 41 is placed below a saddle of the bicycle to face the road behind the bicycle 200.

Figure 5:
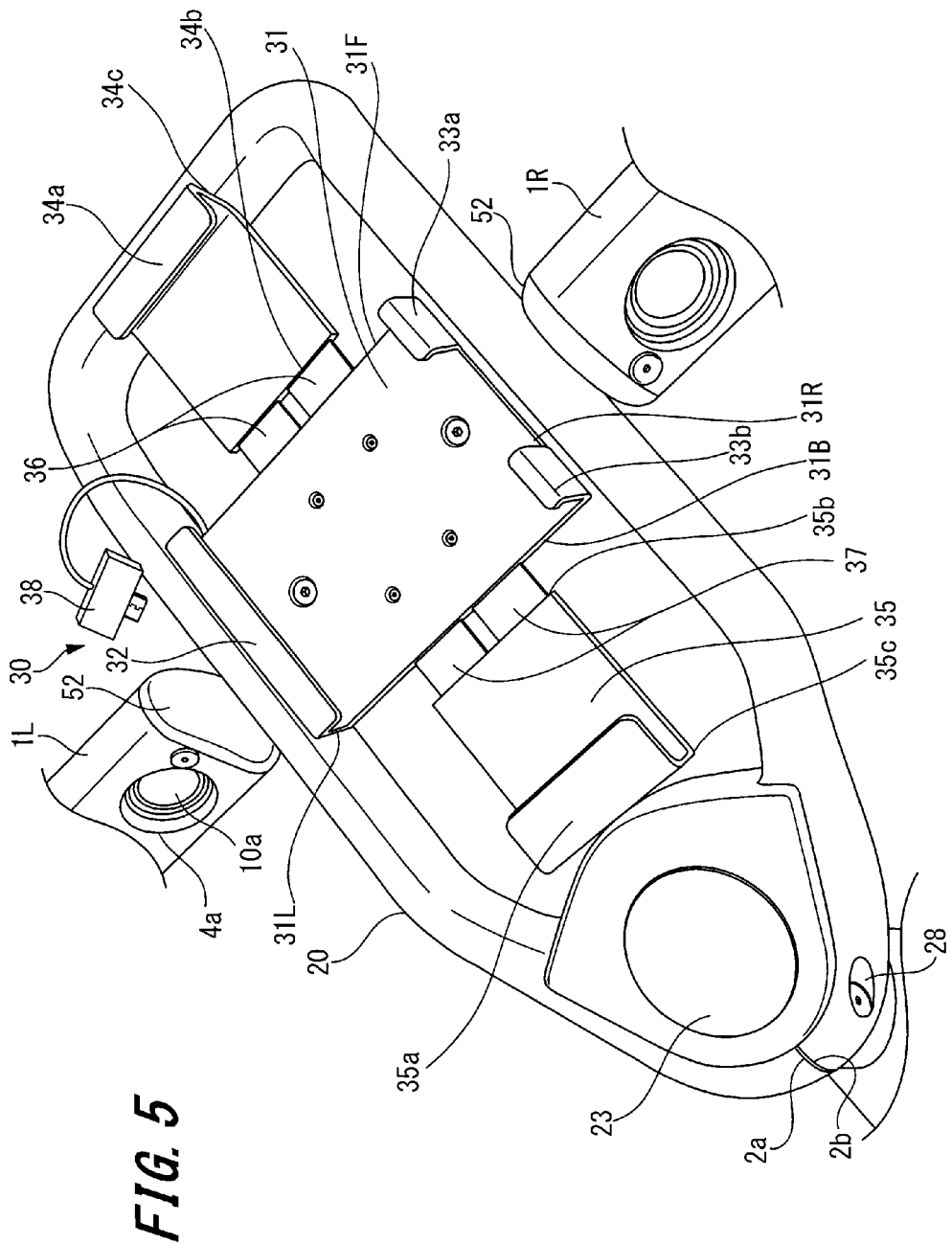
FIG. 5 is a perspective view of a mounting system of the stem head, according to certain aspects of the disclosure.

FIG. 5 is a perspective view of a mounting system 30 of the stem head 20, according to certain aspects of the disclosure.

The mounting system 30 enables to lodge and dislodge the mobile device 40 onto the stem head 20. The mounting system 30 includes a base 31, an upper slide member 34 sliding along a pair of upper guides 36, and a lower slide member 35 sliding along a pair of lower guides 37.

The base 31 is affixed to the tubular handlebar 1 by being fastened to the upper side member 26a through a pair of bolts or any kind of fastening devices or means, such as screws, rivets, or clips, gluing, double sided adhesive or any technic known by a person having ordinary skill in the art.

The base 31 is a substantially rectangular plate with a left side 31L facing the left side tubular handlebar component 1L, a right side 31R facing the right side tubular handlebar component 1R, an lower side 31B facing the stem rod 23, and an upper side 31F facing the road ahead of the bicycle 200.

The left side 31L of the base 31 is bent towards the right side 31R to form a left side latching part 32 with a predetermined profile. Similarly, the left side 31L of the base 31 is bent towards the right side 31R to form an upper right side latching part 33a and a lower right side latching part 33b having each a predetermined profile. The left side latching part 32 covers totally the left side 31L, while the upper right side latching part 33a and the lower right side latching part 33b cover partially the right side 31R leaving a central part of the right side 31R open.

The upper slide member 34 is a substantially rectangular plate with a lower side 34b facing the upper side 31F of the base 31 and an upper side 34c facing the road ahead of the bicycle 200. The pair of upper guides 36 perpendicularly protrudes from the upper side 31F of the base 31 and is inserted into the lower side 34b of the upper slide member 34. As for the left side latching part 32, the upper side 34c is bent towards the lower side 34b to form an upper latching part 34a with a predetermined profile. The upper latching part 34a covers totally the upper side 34c.

The lower slide member 35 is a substantially rectangular plate with a upper side 35b facing the lower side 31B of the base 31 and an lower side 35c facing the stem head 20. The pair of lower guides 37 perpendicularly protrudes from the lower side 31R of the base 31 and is inserted into the upper side 35b of the lower slide member 35. As for the upper side 34c of the lower slide member 35, the lower side 35c is bent towards the upper side 35b to form a lower latching part 35a with a predetermined profile. The lower latching part 35a covers totally the lower side 35c.

The user lodges the mobile device 40 into the mounting system 30 by inserting the mobile device 40 between the left side latching part 32 on one side, and the upper right side latching part 33a and the lower right side latching part 33b on the other side.

The mobile device 40 is maintained in place by being pushed between the left side latching part 32 and the combination of the upper right side latching part 33a and the lower right side latching part 33b. In addition, the predetermined profiles of the left side latching part 32, the upper right side latching part 33a, and the lower right side latching part 33b are such that the mobile device 40 is also maintained in place by being pushed against the base 31.

The user can dislodge the mobile device 40 by inserting at least one finger on the opening between the upper right side latching part 33a and the lower right side latching part 33b, and by pulling upward the mobile device 40.

The user can further lodge and secure the mobile device 40 by sliding the upper slide member 34 and the lower slide member 35 towards each other in order to clamp the mobile device 40 between the upper latching part 34a and the lower latching part 35a. The user can also dislodge the mobile device 40 by sliding the upper slide member 34 and the lower slide member 35 away from each other. In such a way, the mounting system 30 can be adapted to mobile devices with different sizes.

The mounting system 30 of the stem head 20 provides a way to have the mobile device 40 well affixed, integrated, and balanced on the tubular handlebar 1. As for the sound box 5, the mounting system 30 presented in this disclosure prevent from having any protrusion on the tubular handlebar 1.

Figure 6:
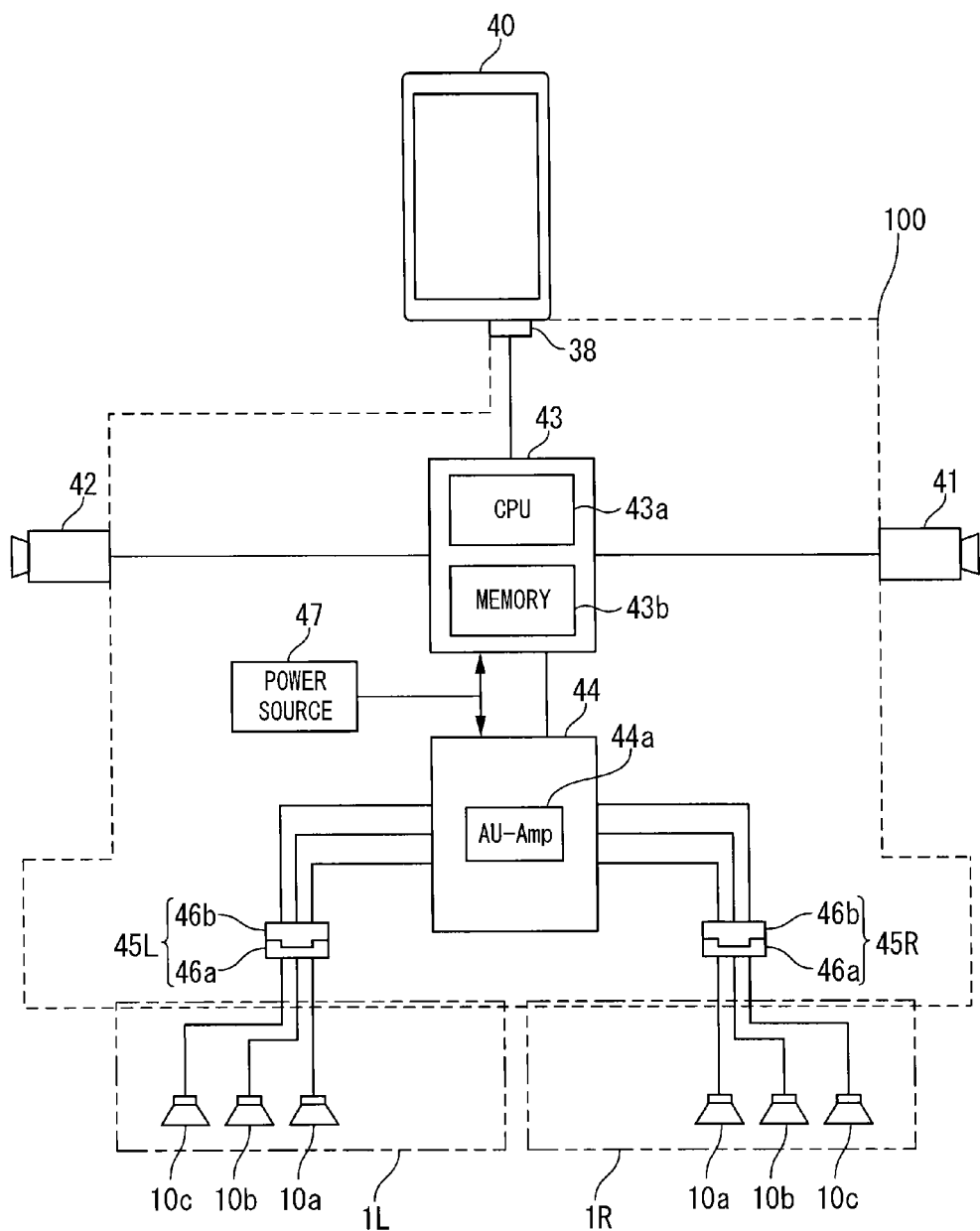
FIG. 6 is a schematic view of a hardware diagram of an electrical module of the tubular handlebar.

FIG. 6 is a schematic view of the hardware diagram of an electrical module 100 of the tubular handlebar 1.

The electrical module 100 includes a connector 38, a Central Processing Unit (CPU) board 43, an amplifier board 44, a left audio connector 45L, a right audio connector 45R and a power source 47.

The connector 38 connects the mobile device 40 to the CPU board 43. The connector 38 may be a Universal Serial Bus (USB) connector or any other connector known by a person having ordinary skill in the art.

The CPU board 43 includes a processor such as a CPU 43a and a computer readable storage medium, such as a memory 43b (e.g., ROM, EPROM, EEPROM, flash memory, static memory, DRAM, SDRAM, and their equivalents). The CPU 43a is configured to control and actuate the front camera 41, the rear camera 42, the speaker units 10a-c through the amplifier board 44, and any sensor or actuator of the present disclosure. The CPU 43a is configured to control the storage and reading of data into the memory 43b. More generally, the CPU 43a is configured to perform and/or control the systems, operations, and processes of this disclosure by running a predetermined program stored in the memory 43b and by taking inputs and/or instructions from the user via the mobile device 40. The inputs and/or instructions as well as the data generated by the user may be stored in the memory 43b or any memory external to the electrical module 100.

For example, the sound level diffused by the speaker units 10a-c can be adjusted by the user via the mobile device 40. Information corresponding to the sound level may be entered by the user via the mobile device 40. This information is then transmitted to the CPU board 43 that controls the amplifier board 44 including an amplifier 44a. The amplifier 44a in return provides a corresponding current to feed the speaker units 10a-c.

The amplifier board 44 is electrically connected to the speaker units 10a-c of the right side tubular handlebar component 1R through the right audio connector 45R. Similarly, the amplifier board 44 is electrically connected to the speaker units 10a-c of the left side tubular handlebar component 1L through the left audio connector 45L. The right audio connector 45R and the left audio connector 45L each includes a female part 46a connected to the speaker units 10a-c and a male part 46b connected to the amplifier board 44. The male part 46b can be plug and unplug from the female part 46a by the user. For example, the female connector 46a and male connector 46b may be any kind of audio jack and its corresponding pin plug. Furthermore, the amplifier board 44 and speaker units 10a-c can be connected through wirelessly (Wi-Fi, Bluetooth and so on), instead of physical connection through the audio connector 45R and 45L.

Through the left audio connector 45L and the right audio connector 45R, the speaker units 10a-c can be disconnected from the amplifier board 44. Such a disconnection enables to remove the tubular handlebar 1 from the bicycle 200 which may be useful to perform maintenance on the bicycle 200.

The power source 47 feeds the CPU board 43 as well as the amplifier board 44. The power source 47 may be an internal battery of the electrical module 100, a battery of the mobile device 40, a battery feeds by a dynamo attached to the bicycle 200, a dry cell or any source of energy known by a person having ordinary skill in the art.

In another embodiment, the communication between the mobile device 40 and the electrical module 100 may be done wirelessly (Wi-Fi, Bluetooth and so on) instead of physical connection through the connector 38.

In addition, the CPU board 43 and the amplifier board 44 as well as the power source 47 may be placed inside the connection member 11.

Figure 7:
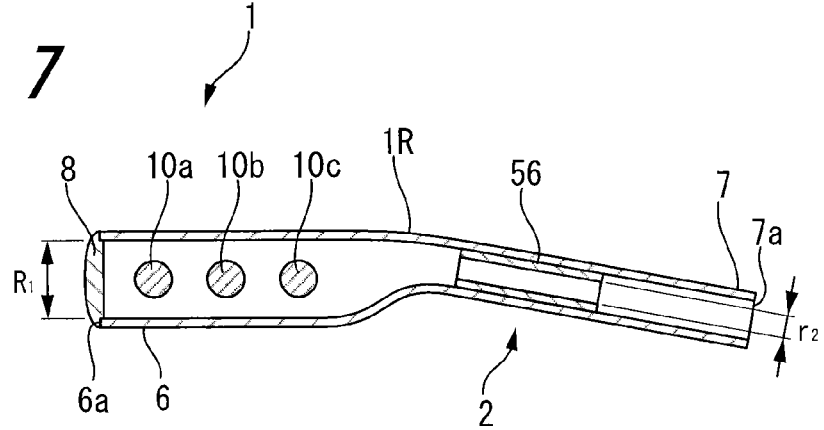
FIG. 7 is a sectional view of the tubular handlebar with a duct diameter adjustment member, according to certain aspects of the disclosure.

FIG. 7 is a sectional view of the tubular handlebar 1 with a duct diameter adjustment member 56, according to certain aspects of the disclosure.

In another embodiment, the bass reflex system is implemented by the duct diameter adjustment member 56. The duct diameter adjustment member 56 has a tubular shape with an internal diameter r2 smaller than the internal diameter R1 of the inner opening part 6a, and a length l2. The duct diameter adjustment member 56 is placed inside the tubular handlebar 1 between the speaker unit 10c and the outer edge part 7, and affixed to the internal peripheral surface of the tubular handlebar 1.

The duct diameter adjustment member 56 may be affixed to the internal peripheral surface of the tubular handlebar 1 through any kind of fastening devices or means, such as screws, rivets, or clips, gluing, double sided adhesive or any technic known by a person having ordinary skill in the art.

The duct diameter adjustment member 56 may be made from composite, raw or polymeric materials such as Acrylonitrile-Butadiene-Styrene (ABS) resins.

The inner opening part 6a is completely occluded by a first cover body 8, similar to the cover part 52, while the outer opening part 7a is completely opened.

Similarly to the bass reflex duct 53, the duct diameter adjustment member 56 improves the acoustic characteristics of the tubular handlebar 1 but through a simpler design. The sound generated from the rear part of the speaker units 10a-c goes through the duct diameter adjustment member 56 before being released to the external environment through the outer opening part 7a. Due to the small size of the internal diameter r2, the duct diameter adjustment member 56 provides a constricted section that improves the acoustic characteristics of the tubular handlebar. In such a way, the reproduction of the lowest frequencies generated from the rear part of the speaker units 10a-c is enhanced.

Figure 8:
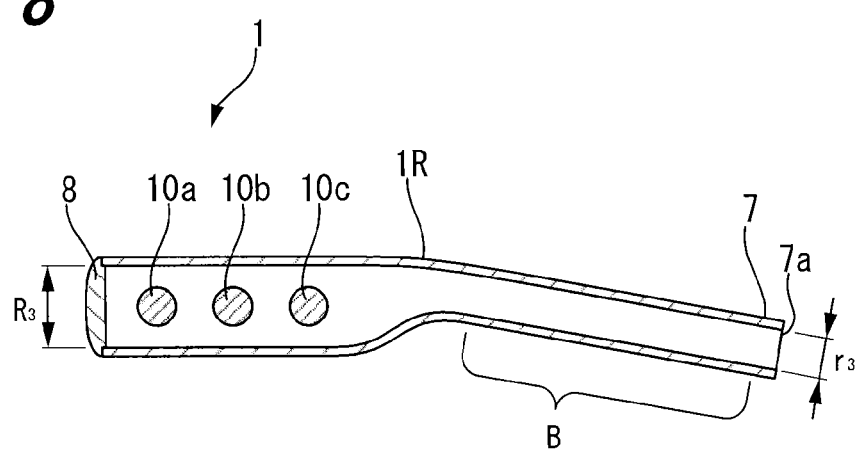
FIG. 8 is a sectional view of the tubular handlebar without the duct diameter adjustment member, according to certain aspects of the disclosure.

FIG. 8 is a sectional view of the tubular handlebar 1 without the duct diameter adjustment member 56, according to certain aspects of the disclosure.

In another embodiment, the bass reflex duct 53, the enclosure 51, and the duct diameter adjustment member 56 have been removed from the tubular handlebar 1. In this embodiment, the bass reflex system is directly implemented by the internal peripheral surface of the tubular handlebar 1.

The internal peripheral surface of the tubular handlebar 1 is characterized by a large tubular part connected to a small tubular part B. The large tubular part has at the inner edge part 6, a large cross section with a diameter R3, while the small tubular part B has at the outer edge part 7, a small cross section with a diameter r3 forming the outer opening part 7a. The large cross section is completely occluded by the first cover body 8, while the small cross section is completely opened to the external environment through the outer opening part 7a.

In this embodiment, the bass reflex system is implemented by the small tubular part B. Similarly to the bass reflex duct 53 and the duct diameter adjustment member 56, the small tubular part B improves acoustic characteristics but through a design that directly uses the shape of the tubular handlebar 1. The sound generated from the rear part of the speaker units 10a-c goes through the small tubular part B before being released to the external environment through the outer opening part 7a. The small tubular part B provides a constricted section, the diameter r3 being smaller than the diameter R3, that improves acoustic characteristics.

In such a way, the reproduction of the lowest frequencies generated from the rear part of the speaker units 10a-c, is enhanced.

Figure 9:
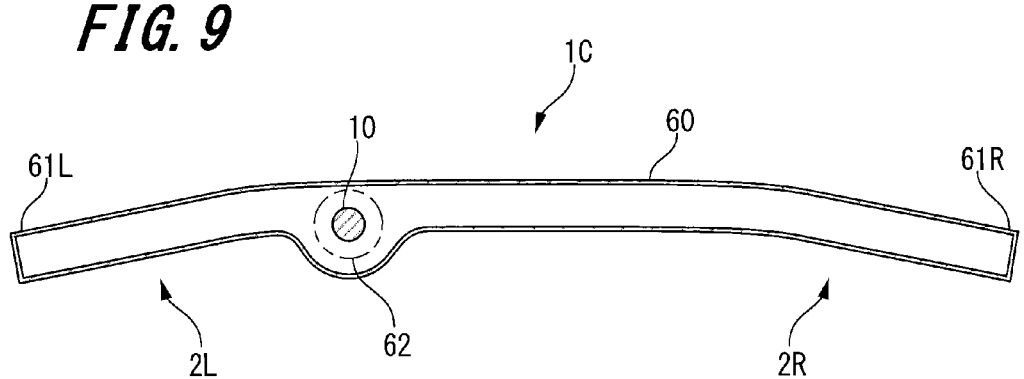
FIG. 9 shows a sectional view of the tubular handlebar composed by a singular tubular handlebar component, according to certain aspects of the disclosure.

FIG. 9 shows a sectional view of the tubular handlebar 1 composed by a singular tubular handlebar component 1C, according to certain aspects of the disclosure.

In another embodiment, the tubular handlebar 1 is composed by the singular tubular handlebar component 1C instead of the right side tubular handlebar component 1R and the left side tubular handlebar component 1L linked by the connection member 11.

The singular tubular handlebar component 1C includes a formed by a hollow tube 60 occluded on one side by a left edge part 61L and occluded on another side by a right edge part 61R. Near the left edge part 61L and the right edge part 61R a left handle grip part 2L and a right handle grip part 2R are placed, respectively. In addition, between the left handle grip part 2L and the right handle grip part 2R at least one speaker unit 10 is embedded in the hollow tube 60 via a second cover body 62.

The at least one speaker unit 10 is affixed to the second cover body 62 via any kind of fastening devices or means, such as screws, rivets, or clips, gluing, double sided adhesive or any technic known by a person having ordinary skill in the art. Similarly, the second cover body 62 is affixed to the hollow tube 60 via any kind of fastening devices or means, such as screws, rivets, or clips, gluing, double sided adhesive or any technic known by a person having ordinary skill in the art.

From the left edge part 61L to the right edge part 61R the hollow tube 60 has a cross sectional area that increases only around the speaker unit 10.

A bass reflex system may be implemented by opening the left edge part 61L or/and the right edge part 61R by a hole and inserted the bass reflex duct 53 or the duct diameter adjustment member 56 inside the hollow tube 60.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present invention are possible in light of the above teachings. It is therefore to be understood that within the scope of the appended claims, the invention may be practiced otherwise than as specifically described herein.

What is claimed is:

1. A bicycle handlebar comprising:
   a tubular structure with an internal peripheral surface,
   an outer end being open that allows air circulation from an external environment,
   an inner end being closed,
   at least one speaker unit embedded into at least one through hole on the internal peripheral surface, wherein each speaker unit of the at least one speaker unit has a face exposed to the external environment and oriented in an upward direction substantially normal to the internal peripheral surface, and
   a bass reflex system that channels sound from a rear part of the at least one speaker to the external environment, via the outer end, and to enhance the reproduction of the lowest frequencies generated from the rear part of the at least one speaker unit.

2. The bicycle handlebar of claim 1, wherein the tubular structure further includes a first side handlebar component, a second side handlebar component, and a connection member, wherein the connection member connects the first side handlebar component with the second side handlebar component and is affixed to a stem head with a mounting system to mount and dismount a mobile device.

3. The bicycle handlebar of claim 2, wherein the tubular structure further includes a first connector to electrically connect the mobile device to a second connector, wherein the second connector is electrically connected to the at least one speaker unit.

4. The bicycle handlebar of claim 3, wherein the second connector is detachable and attachable.

5. The bicycle handlebar of claim 4, wherein a first camera is affixed to the stem head and connected to the mobile device via the first connector.

6. The bicycle handlebar of claim 1, wherein the outer end includes a first cross sectional area and the inner end includes a second cross sectional area, the first cross sectional area being smaller than the second cross sectional area.

7. The bicycle handlebar of claim 6, wherein the internal peripheral surface includes an inner tubular part starting from the second cross sectional area and an outer tubular part ending by the first cross sectional area, wherein the inner tubular part is larger in volume than the outer tubular part.

8. The bicycle handlebar of claim 7, wherein the outer tubular part has a length and a diameter that are manufacturable at different values to change the acoustic characteristics of the sound generated by the rear part of the at least one speaker unit.

9. The bicycle handlebar of claim 1, wherein the bass reflex system includes a duct diameter adjustment member affixed to the internal peripheral surface.

10. The bicycle handlebar of claim 9, wherein the duct diameter adjustment member has a length and a diameter that are manufacturable at different values to change the acoustic characteristics of the sound generated by the rear part of the at least one speaker unit.

11. The bicycle handlebar of claim 9, wherein the duct diameter adjustment member is placed between the at least one speaker unit and the outer end.

12. The bicycle handlebar of claim 1, wherein the tubular structure further includes:
   a sound box in immediate contact with the internal peripheral surface and housing the rear part of the at least one speaker unit.

13. The bicycle handlebar of claim 12, wherein the bass reflex system includes a bass reflex duct connecting the sound box with the outer end.

14. The bicycle handlebar of claim 12, wherein the bass reflex duct has a length and a diameter that are manufacturable at different values to change the acoustic characteristics of the sound generated by the rear part of the at least one speaker unit.

15. A bicycle comprising:
   a stem head with a mounting system to mount and dismount a mobile device; and
   a tubular handlebar with an internal peripheral surface, the tubular handlebar including:
      an outer end being open that allows air circulation from an external environment,
      an inner end being closed, at least one speaker unit embedded into at least one through hole on the internal peripheral surface, wherein each speaker unit of the at least one speaker unit has a face exposed to the external environment and oriented in an upward direction substantially normal to the internal peripheral surface, and a bass reflex system that channels sound from a rear part of the at least one speaker to the external environment, via the outer end, and to enhance the reproduction of the lowest frequencies generated from the rear part of the at least one speaker unit.

16. The bicycle of claim 15, wherein the tubular handlebar further includes a first side handlebar component, a second side handlebar component, and a connection member, wherein the connection member connects the first side handlebar component with the second side handlebar component and is affixed to the stem head.

17. The bicycle of claim 15, wherein the mounting system further includes a first connector to electrically connecting the mobile device to a second connector, wherein the second connector is electrically connected to the at least one speaker unit.

18. The bicycle of claim 17, wherein the second connector is detachable and attachable.

19. The bicycle of claim 18, wherein a first camera is affixed to the stem head and connected to the mobile device via the first connector.

20. The bicycle of claim 15, wherein the outer end includes a first cross sectional area and the inner end includes a second cross sectional area, the first cross sectional area being smaller than the second cross sectional area.

* * * * *